United States Patent
Tubidis et al.

(10) Patent No.: US 7,198,393 B2
(45) Date of Patent: Apr. 3, 2007

(54) FLEXIBLE VEHICLE DISPLAY SCREEN

(75) Inventors: Athanassios L. Tubidis, Thessaloniki (GR); James J. Farber, Holland, MI (US); John Krsteski, Shelby Township, MI (US); Ted W. Ringold, Hudsonville, MI (US); Samuel Centellas, Saginaw, MI (US)

(73) Assignee: Johnson Controls Technology Company, Holland, MI (US)

( * ) Notice: Subject to any disclaimer, the term of this patent is extended or adjusted under 35 U.S.C. 154(b) by 230 days.

(21) Appl. No.: 10/487,965

(22) PCT Filed: Sep. 3, 2002

(86) PCT No.: PCT/US02/27859

§ 371 (c)(1),
(2), (4) Date: Sep. 15, 2004

(87) PCT Pub. No.: WO03/020545

PCT Pub. Date: Mar. 13, 2003

(65) Prior Publication Data

US 2005/0030256 A1 Feb. 10, 2005

Related U.S. Application Data

(60) Provisional application No. 60/316,682, filed on Aug. 31, 2001.

(51) Int. Cl.
*B60Q 3/04* (2006.01)

(52) U.S. Cl. .................. 362/489; 313/511; 345/36; 345/45

(58) Field of Classification Search ............... 362/489, 362/540, 29; 116/35 R; 257/40, 88, 92; 313/500, 511; 345/36, 45, 905
See application file for complete search history.

(56) References Cited

U.S. PATENT DOCUMENTS

| 5,469,020 | A  | * | 11/1995 | Herrick ................. 313/511 |
| 6,274,985 | B1 | * | 8/2001  | Haynes .............. 315/169.3 |
| 6,511,198 | B1 | * | 1/2003  | Erickson ............... 313/510 |
| 2001/0043164 | A1 | * | 11/2001 | Thagard et al. ............. 345/7 |
| 2002/0071082 | A1 | * | 6/2002  | Okita et al. ............... 349/145 |
| 2002/0130614 | A1 | * | 9/2002  | Huitema et al. ............ 313/506 |

* cited by examiner

*Primary Examiner*—Sandra O'Shea
*Assistant Examiner*—Ismael Negron

(57) ABSTRACT

A conformable vehicle display includes a flexible display screen coupled to a substrate. The substrate is a curved transparent substrate that is adapted to be coupled to a vehicle component having a curved exterior surface. The flexible display screen is at least partially separate from the exterior surface of the vehicle component and has a luminescent display. The exterior surface of the vehicle component is visible through the flexible display screen and the substrate when the flexible display screen is not activated. The flexible display screen may be a transparent organic light emitting diode display device.

29 Claims, 4 Drawing Sheets

FLEXIBLE VEHICLE DISPLAY SCREEN

FIELD OF THE INVENTION

The present invention relates generally to the art of displays and more specifically to displays used in vehicle interiors. Still more specifically, the present invention relates to displays which may be applied to a variety of vehicle interior surfaces, such as the instrument panel, consoles, and the like, and wherein the displayed information can be pictures, numerical data, warning information, educational or entertainment material, and other information useful to the vehicle's driver and/or to passengers.

BACKGROUND OF THE INVENTION

A wide variety of information about a vehicle, its performance, maintenance, orientation, and the condition of its numerous systems (fuel, door closure, temperature) and the like have been collected and displayed within vehicle interiors for many years. In recent years, with technology developments accelerating at heretofore unbelievable rates, the types of information collected, the accuracy thereof and the methods for displaying the information have also been increasing. Examples include compass and mirror technology and the combination thereof, where compass headings are displayed on the surface of the vehicle interior.

These various examples of information collection and/or display are provided purely for purposes of establishing a general background from which the display improvement of the present invention can be appreciated. At present, the displays themselves, wherever they have been located, involve hardware and systems which are typically designed for specific applications for reasons of size, attachment, supplying power thereto or the like. Little flexibility currently exists for using conformable display surfaces in a variety of vehicle locations. Further, other conventional display technology (e.g., liquid crystal display ("LCD"), light emitting diode ("LED"), etc.) incorporate a lens and is located in a module (e.g., wherein the lens is a first or exterior surface and the display is a second or inner surface). (The lens is typically used to cover or obscure circuit boards and the like.) Additionally, conventional display technology (particularly LCD displays) are only used in a flat and/or non-flexible surface application.

To provide a reliable, widely adaptable, self-illuminating vehicle display that is less expensive, has higher contrast, and uses less energy than conventional displays (e.g., LCDs, and the like) and avoids the above-referenced and other problems would represent a significant advance in the art.

SUMMARY OF THE INVENTION

A primary feature of the present invention is to provide a vehicle display which provides interior designers with enhanced flexibility and aesthetics.

Another feature of the present inventions is to provide a display system which requires little space and which may be located in a wide variety of locations within a vehicle interior.

Another feature of the present inventions is to move the display to the first surface and provide a vehicle display that does not require a lens.

A different feature of the present inventions is to provide a display which may be placed over, rather than within, a vehicle interior component and may resemble a contoured surface profile.

Yet another feature of the present inventions is to provide a display surface which yields a high quality display of any one or more kinds of data, including but not limited to safety, vehicle condition, entertainment, educational and status data.

Another feature of the present inventions is to provide a display which may be installed using assembly techniques which are commonly used to install trim covers, including installation on curved surfaces, whether they be convex or concave.

How these and other objects of the present inventions are accomplished, individually, collectively or in various sub-combinations will be described in the following detailed description of preferred and alternate embodiments, taken in conjunction with the FIGURES. Generally, however, they are accomplished by using a thin, flexible display screen or sheet (such as organic light emitting diode ("OLED"), LCD material, flexible LCD, thin film electro-luminescent ("TFEL"), or other suitable display technology, and preferably organic sheet of light-emitting diode material. The display may be in any shape (e.g., square, circular, oval, etc.) and may be applied over a variety of interior surfaces, including but not limited to the instrument panel, consoles, door, pillar, side trim panels, etc. More than one such display sheet may be employed for displaying the same or different information. The display screen can be the first surface (e.g., the exterior surface exposed to the passenger compartment), recessed behind a plastic (protective) substrate, sprayed or poured into a recess (e.g., OLED), insert molded, etc. The information displays can be fixed in place using the same trim hardware as is currently used to cover the pillar with leather, vinyl, fabric, foam and other cover materials. Alternatively, the display sheet may be attached using mechanical fasteners (such as snaps, screws, clips, etc.), other fasteners (such as Velcro® hook and loop fasteners), sewing, adhesives, etc. Also, the display sheet can be insert molded along with a fabric material or other aesthetic or functional article. This ease of assembly makes adoption of the display to different types or sizes of vehicles much easier than would be the case in conventional applications (e.g., if deep recesses, holes, apertures, etc. were required to receive thicker display devices). Also, protecting the display is intended to enhance reliability and reduce cost associated with damaged displays. The color of the display sheet can also be coordinated with the remainder of the vehicle interior. Other ways in which the various features of present invention can be accomplished will be described later herein, and still others will appear to those skilled in the art after they have read this specification. Such other ways are deemed to fall within the scope of the present invention, if they fall within the scope of the claims which follow. Additionally, the displayed image may be provided by ultraviolet ("UV") light being projected through a substrate with or without an insert or over-molded fabric.

The present invention further relates to various features and combinations of features shown and described in the disclosed embodiments. Other ways in which the objects and features of the disclosed embodiments are accomplished will be described in the following specification or will become apparent to those skilled in the art after they have read this specification.

BRIEF DESCRIPTION OF THE DRAWINGS

The invention will become more fully understood from the following detailed description taken in conjunction with the accompanying drawings, wherein like reference numerals refer to like elements, in which.

DETAILED DESCRIPTION OF PREFERRED AND OTHER EXEMPLARY EMBODIMENTS

Figure 1:
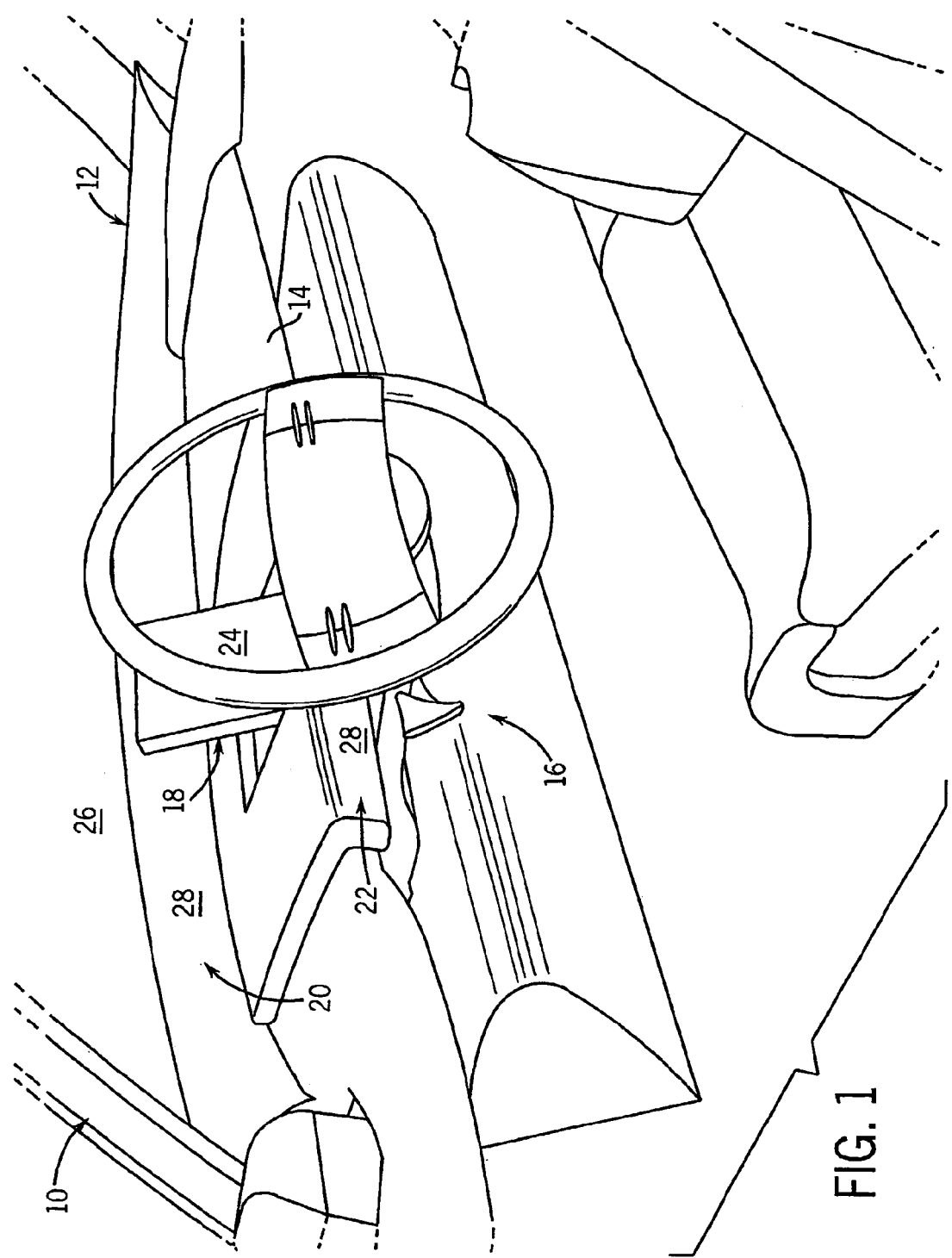
FIG. 1 is a perspective view of a vehicle and instrument panel having various vehicle display options.

Before beginning the detailed description of the preferred and alternate embodiments of the present inventions, several general comments can be made about the applicability and scope thereof. First, as indicated above, the location of the display of the invention may be widely varied, and, in fact, can be on practically every interior trim surface. Examples, for illustration purposes rather than by way of limitation, include the instrument panel, the steering column, overhead systems (including the headliner or sun-roof cover, etc.), consoles, door, window, windshield, etc.

Second, the number of displays can vary. For example, a display may be provided for the driver, while instrument panel and/or seat displays may be provided for first or second row passengers. Since the number of displays can be varied, the types of data or information displayed thereon can also be varied, so that each display screen or sub-grouping of display screens can show different information.

Third, a preferred screen material is a flexible, organic LED (OLED) screen such as that available from Pioneer, Kodak, DuPont, or Philips. (Alternatively, the flexible LCD is available from Philips, and the TFEL is available from Planas.) Such OLED display screens may be transparent, such as a transparent organic light emitting device available from Universal Display Corporation that is used in an exemplary embodiment. The primary attributes of display screens of the present inventions are that they be thin, flexible (or moldable) enough so that they may be applied to either planar or curved surfaces and that they provide sufficient clarity of the information or data to be displayed. Black and white, other monochromatic displays, or full color display screens are within the scope of the present invention.

Fourth, the manner of attachment of the display to the vehicle interior can also be widely varied. Several non-limiting examples are described here. One could be a generally planer display that replaces conventional cockpit clusters. Another would be a curved (almost semi-circular) display screen adapted to be coupled to the interface between the windshield and the dashboard or to the dashboard. The back side of the screen is shaped to match the exterior surface of the pillar facing the driver. The screen can be held in place using trim fastener strips or other components known in the vehicle art, and in an especially preferred embodiment is affixed to the pillar at the same time the remaining trim is applied, thereby eliminating the need for an additional manufacturing, step. A display screen of the present invention can also be adhered (using a suitable adhesive, e.g., a liquid adhesive), sewn, clipped, snapped or fastened to the desired interior surface either during initial fabrication or in a separate, subsequent step. Two-part fasteners, e.g., Velcro® hook and loop fasteners, can be used for the removable attachment of the display screen to the trim surface.

Fifth, the source and type of information to be displayed on the displays of the present invention can also be varied widely. One example is to provide the driver with vehicle information collected inside or outside of the vehicle. Another example is to provide vehicle performance (e.g., speed, RPM, etc.) information to the driver. Both of these examples have the obvious advantage of eliminating the need for the driver to look and search downward to observe this type of information, thereby decreasing the likelihood that an accident would occur resulting from the driver's eyes being taken "off the road." Other examples include providing the display of vehicle condition (e.g., temperature, heading, fuel levels, etc.), ambient conditions (e.g., temperature), safety information (e.g., tire pressure or wear, low fuel, overheating, low oil, excessive speed, tire slippage, etc.). Other uses for the display of the present invention are also included and will be readily appreciated by present and future vehicle designers after they read this specification.

Sixth, the particular type of data gathering, generating or processing can vary as widely as the types of information. For example sensors can be used to capture internal or external information which are then processed for display on the display screen. The information gathering, generating or processing systems, in and of themselves, do not form part of the present invention. They can be self powered (e.g., by one or more batteries), solar powered, or coupled to the vehicle's electrical system.

Figure 2:
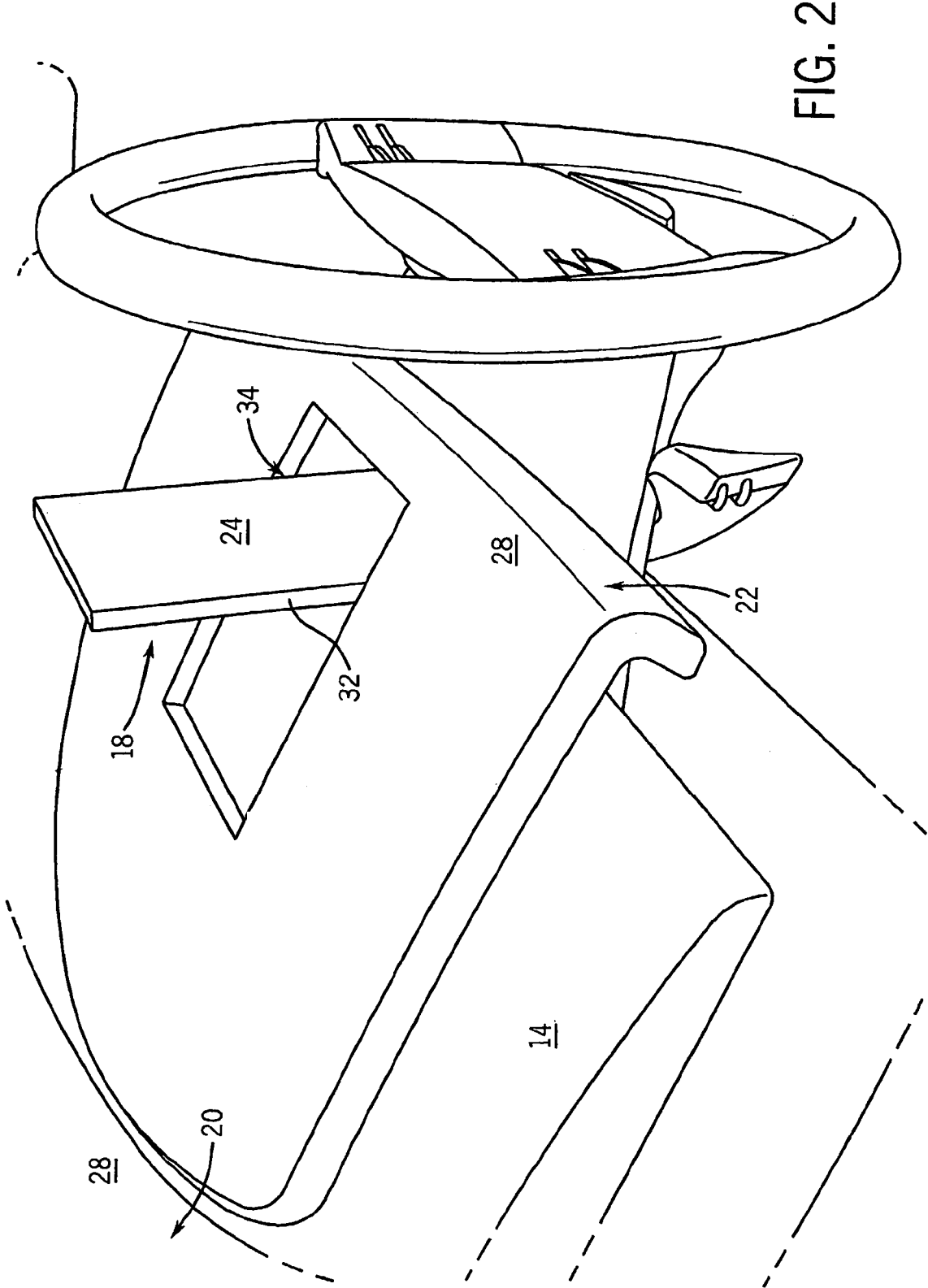
FIG. 2 is a perspective view of an instrument panel having a vehicle display.
Figure 3:
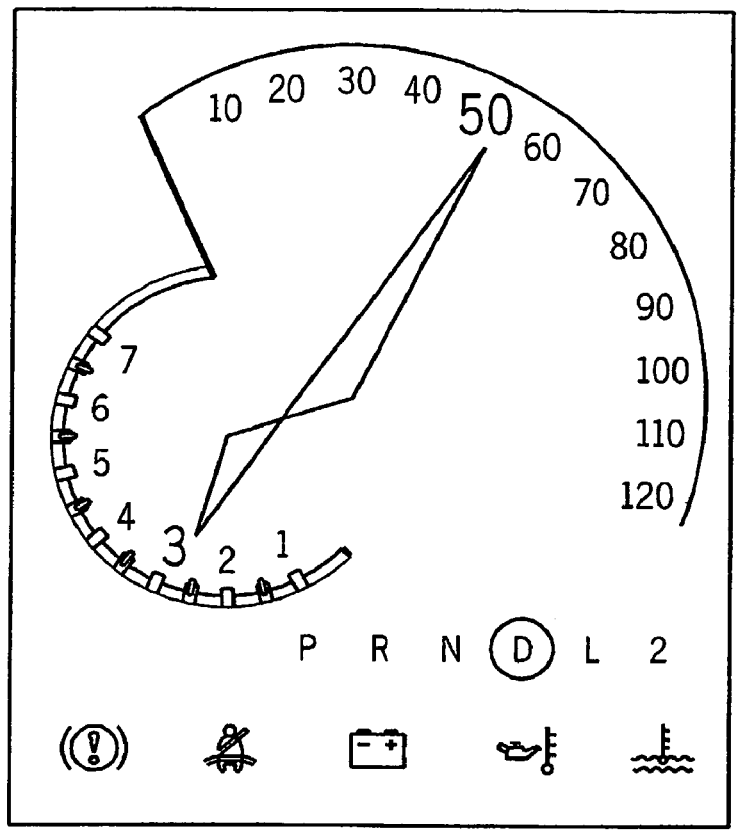
FIG. 3 is a schematic representation of information that may be depicted on a vehicle display.

Referring to FIGS. 1 and 2, a vehicle 10 with a passenger compartment 12 includes an instrument panel or dashboard 14, a steering wheel assembly 16, and a plurality of information displays (shown as an information display 18, a forward information display 20, and a dashboard information display 22). According to a preferred embodiment, the information displays described herein are configured to replace conventional analog and liquid crystal display ("LCD") instrument panels., According to an exemplary embodiment, an instrument panel cluster (shown as information display 18) is coupled to dashboard 14 and configured to integrate vehicle or environmental information (e.g., tachometer, speedometer, and the like) (see FIG. 3). Information display 18 is moveable between a stowed position (where display and dashboard 14 provides general planer surface) and a operational or deployed position (FIGS. 1 and 2). According to a preferred embodiment, information display 18 incorporates organic light emitting device ("OLED") technology. The OLED is made from a series of organic, thin films between a pair of conductors. When electrical current is applied to the conductors, light is emitted. Information display may be monochrome or color. According to a preferred embodiment, information display 18 incorporates transparent OLED technology so that information display 18 can be transparent or translucent (e.g., tinted).

Figure 7:
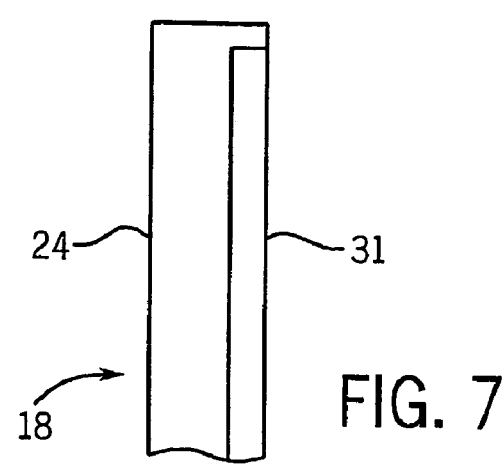
FIG. 7 is a partial sectional view of a vehicle display having a substrate and a display screen.

According to an exemplary embodiment, a screen 31, which may have OLED technology, is mounted on a rigid substrate 24, which is configured to support the screen 31 and to provide protection to the OLED itself (see for example FIG. 7). According to a preferred embodiment, information display 18 includes a frame 32 (which may be located on 1 or more sides of information display 18), a pivot 34, and a ribbon cable (or over-molded wires, screened-on circuits, and the like) configured to provide data and power to the OLED. According to a preferred embodiment, a tachometer and speedometer use digital technology to graphically represent analog information (e.g., digital animation of analog gauges). The OLED information display 18 digitally integrates the tachometer and the speedometer into the same graphic image or scheme, thereby transferring the conventional analog information to a digital representation. The display of the tachometer and speedometer can be related in a continuous image and communicated simultaneously (e.g., sharing a common linear line and digitized analog "needles" that are shaped based on the relative road and engine speed data and their mathematical relationship). According to a preferred embodiment, information display is rotated to approximately 65 degrees. Alternatively, the information display can be configured to be angled at any of a variety of orientations.

Figure 4:
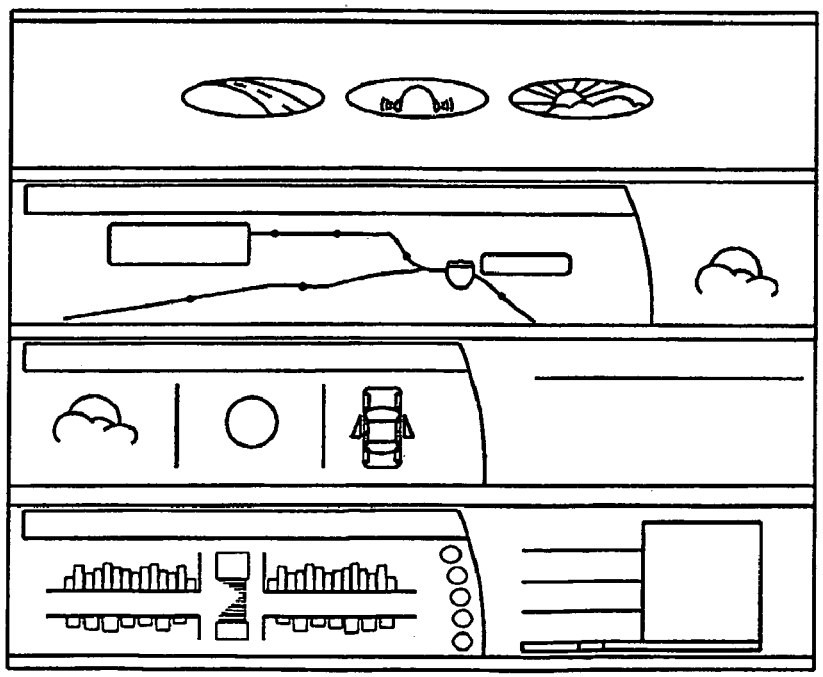
FIG. 4 is a schematic representation of information that may be depicted on a vehicle display.

Referring to FIGS. 1 and 4, forward information display 20 is located at the interface of dashboard 14 and the windshield 26, and is configured to provide vehicle or environmental information such as navigation information (e.g., a map, directions, compass information and the like, which can be tied to a global positioning satellite ("GPS") system), environmental information (e.g., current weather information, forecast information, and the like), vehicle information (e.g., system status, open door information, wheel air pressure, fuel level, oil pressure, battery charge information, and the like), business operation (e.g., stock information and the like), entertainment information (e.g., volume, radio or recorded information, and the like), etc.

Figure 5:
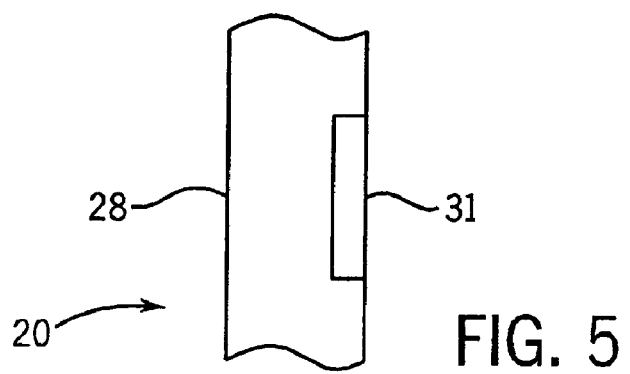
FIG. 5 is a partial schematic sectional view of a substrate having a display screen.

According to a preferred embodiment, forward information display 20 incorporates OLED technology. Preferably, OLED technology is coupled (e.g., bonded, fastened, insert molded, etc.) to or into a rigid substrate (e.g., translucent or transparent). The substrates 24 or 28 can be any of a variety of moldable materials. Preferably, substrates 24 or 28 are acrylic, polycarbonate, or other clear moldable material. Alternatively, substrates 24 or 28 are tinted. Alternatively, the OLED sheet or screen can provide the first surface (i.e., exposed to the interior of the vehicle), which may be held in a frame or mounted to a substrate. Alternatively, the OLED material is sprayed or poured into a recess in the substrate. Alternatively, the OLED screen is insert molded with the substrate, which may also include a fabric material or other material insert molded therewith. FIG. 5 shows the screen 31 disposed on surface of substrate 28, but in other embodiments the screen may be insert molded to be placed in a center region of ,the substrate.

According to an alternative embodiment, forward information display 20 includes rear projection technology that is configured to display the information on a rigid substrate 28. As shown in FIG. 1, forward information display 20 is disposed at the interface between windshield 26 and dashboard 14. Alternatively, forward information display 20 can extend up along or towards windshield 26 (e.g., when substrate 28 is transparent to provide full viewing access).

Referring to FIGS. 1 and 2 dashboard information display 22 is configured similar to forward information display 20. According to a preferred embodiment, dashboard information display 22 incorporates OLED technology. Preferably, OLED technology is coupled (e.g., bonded, fastened, insert molded, etc.) to or into a rigid substrate (e.g., translucent or transparent). The substrates 24 or 28 can be any of a variety of moldable materials. Preferably, substrates 24 or 28 are acrylic, polycarbonate, or other clear moldable material. According to an alternative embodiment, dashboard information display 22 incorporates rear projection technology. Dashboard information display 22 may be configured to display any of a variety of vehicle or environmental information (e.g., such as that discussed above with regard to forward information display 20).

Figure 6:
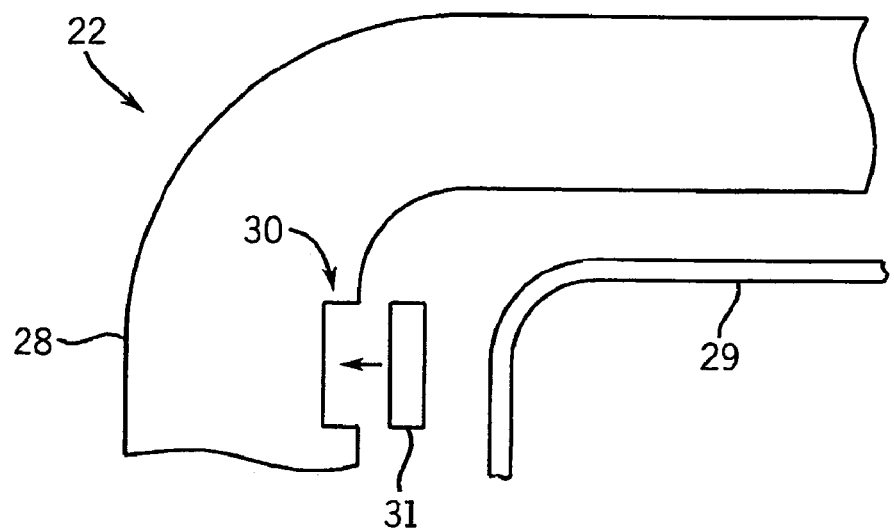
FIG. 6 is an exploded sectional view of a vehicle display having a substrate, display screen, and a fabric layer.

According to an alternative embodiment, information display 18, forward information display 20, and/or dashboard information display 22 incorporate insert molded fabric 29 configured to provide a textured or aesthetic appearance. Referring to FIG. 6, according to an exemplary embodiment, the screen 31 disposed in a recess 30 in substrate 28 prior to fabric being integrally molded with substrate 28. Alternatively, the OLED is integrally molded with the substrate, which may also include a fabric material or other material insert molded therewith.

According to an alternative embodiment, the vehicle information displays (e.g., information display 18, forward information display 20, and/or dashboard information display 22) incorporates ultraviolet ("UV") reflective technology, which uses UV reflective or responsive symbols in the interior of the vehicle that are illuminated by UV lights which are configured to illuminate the pertinent graphic symbols (e.g., warning lights and the like).

According to an alternative embodiment, the fabric wrapped substrate or fabric insert-molded substrate is configured to allow the image to be projected therethrough (e.g., rear projected). The image may be configured to project through the fabric, whereby the fabric is capable of allowing the light to "perforate" through. The image may be projected from inside of the instrument panel or dashboard, which eliminates the conventional LCD screen and its protective lens. As such, the display provides structural support to the passenger compartment interior but still "thin" (or otherwise dimensional) to the image or light to project through.

It is also important to note that the construction and arrangement of the elements of the OLED vehicle display as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces (e.g. clamps, etc.) may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. It should also be noted that the display system may be used in association with a dynamic display, or alternatively other, fixed and non-movable displays or any of a wide variety of other surfaces in any of a wide variety of other applications. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The invention claimed is:

1. A conformable vehicle display, comprising: a curved transparent substrate adapted to be coupled to a vehicle component having a curved exterior surface; and a flexible display screen coupled to the substrate, at least a portion of the display screen being separate from the exterior surface of the vehicle component, the flexible display screen having a luminescent display; wherein the exterior surface is visible through the flexible display screen and the substrate when the flexible display screen is not activated.

2. The conformable vehicle display of claim 1, wherein the exterior surface of the vehicle component comprises a fabric.

3. The conformable vehicle display of claim 1, wherein the vehicle component is an instrument panel, a door, a pillar, or a side trim panel.

4. The conformable vehicle display of claim 1, wherein the substrate comprises acrylic.

5. The conformable vehicle display of claim 1, wherein the flexible display screen is coupled to a surface of the substrate facing the vehicle interior.

6. The conformable vehicle display of claim 5, wherein the flexible display screen is fastened to the substrate.

7. The conformable vehicle display of claim 1, wherein the flexible display screen is incorporated into the substrate.

8. The conformable vehicle display of claim 7, wherein the flexible display screen is disposed in a recess in the substrate.

9. The conformable vehicle display of claim 7, wherein the flexible display screen is insert molded into the substrate.

10. The conformable vehicle display of claim 1, wherein the flexible display screen is a matrix display.

11. The conformable vehicle display of claim 10, wherein the flexible display screen comprises an organic light emitting diode display.

12. The conformable vehicle display of claim 11, wherein the flexible display screen comprises a transparent organic light emitting diode display.

13. The conformable vehicle display of claim 1, further comprising a trim layer incorporated into the substrate between the vehicle component and the flexible display screen.

14. The conformable vehicle display of claim 13, wherein the trim layer is molded into the substrate.

15. The conformable vehicle display of claim 14, wherein the trim layer is a fabric material.

16. A vehicle instrument panel, comprising: a curved base surface; a fabric layer coupled to the base surface; a transparent curved substrate coupled to the base surface above the fabric layer; and a flexible transparent organic light emitting diode display screen coupled to and matching the curvature of the substrate above the fabric layer, wherein the fabric layer is visible when the display screen is off.

17. The vehicle instrument panel of claim 16, wherein the organic light emitting diode display is insert molded into the substrate.

18. The vehicle instrument panel of claim 16, wherein the organic light emitting diode display is incorporated into the substrate.

19. The vehicle instrument panel of claim 18, wherein the organic light emitting diode display is disposed in a recess in the substrate.

20. The vehicle instrument panel of claim 16, wherein the organic light emitting diode display is coupled to a surface of the substrate facing an interior compartment of a vehicle.

21. The vehicle instrument panel of claim 20, wherein the organic light emitting diode display is fastened to the substrate.

22. A method of making a vehicle display, comprising the steps of: providing a vehicle component, a transparent curved substrate, and a flexible light emitting display; coupling the light emitting display to the substrate; and coupling the substrate to a textured exterior surface of the vehicle component.

23. The method of claim 22, further comprising the step of molding the light emitting display into the substrate.

24. The method of claim 22, further comprising the step of molding a fabric layer into the substrate between the flexible light emitting display and the exterior surface.

25. The method of claim 22, further comprising the step of creating a recess in the substrate, wherein the light emitting display is coupled to the substrate by placement into the recess.

26. The method of claim 22, wherein the light emitting display comprises an organic light emitting diode display.

27. The method of claim 22, wherein the exterior surface of the vehicle component is fabric.

28. The method of claim 22, further comprising the step of providing a fabric layer incorporated into the substrate between the vehicle component and the flexible display screen.

29. The method of claim 22, wherein the vehicle component is an instrument panel.

* * * * *